(12) United States Patent
Hettinger et al.

(10) Patent No.: US 7,721,760 B2
(45) Date of Patent: May 25, 2010

(54) DEVICE AND VALVE COMBINATION FOR REVERSING THE FLOW OF FLOWING MEDIA

(75) Inventors: Christoph Hettinger, Ingelfingen (DE); Julia Lauth, Ingelfingen (DE); Josip Martis, Rot am See (DE)

(73) Assignee: Buerkert Werke GmbH, Ingelfingen (DE)

( * ) Notice: Subject to any disclaimer, the term of this patent is extended or adjusted under 35 U.S.C. 154(b) by 559 days.

(21) Appl. No.: 11/725,298

(22) Filed: Mar. 19, 2007

(65) Prior Publication Data

US 2007/0235093 A1    Oct. 11, 2007

(30) Foreign Application Priority Data

Mar. 24, 2006   (DE) ................... 20 2006 004 749 U

(51) Int. Cl.
*F16K 31/06* (2006.01)
(52) U.S. Cl. .................. 137/596.17; 137/884
(58) Field of Classification Search ......... 137/269–271, 137/596.17, 597, 565.26, 625.42, 625.43, 137/884
See application file for complete search history.

(56) References Cited

U.S. PATENT DOCUMENTS

| | | | | | |
|---|---|---|---|---|---|
| 2,553,940 | A | * | 5/1951 | Quartullo | 137/596.17 |
| 2,633,871 | A | * | 4/1953 | Parsons | 137/596.17 |
| 2,821,997 | A | * | 2/1958 | Clay et al. | 137/596.17 |
| 3,002,498 | A | * | 10/1961 | Quayle | 137/596.17 |
| 3,059,621 | A | * | 10/1962 | Ruchser | 137/596.17 |
| 3,215,158 | A | * | 11/1965 | Bass, Jr. et al. | 137/269 |
| 4,108,206 | A | | 8/1978 | Mountain | |
| 4,151,860 | A | * | 5/1979 | Chromik | 137/596.17 |
| 4,285,363 | A | * | 8/1981 | Kolm | 137/596.17 |
| 4,355,661 | A | * | 10/1982 | Mayer | 137/596.17 |
| 4,369,696 | A | * | 1/1983 | Klatt et al. | 137/596.17 |
| 4,529,006 | A | * | 7/1985 | Block et al. | 137/596.17 |
| 4,539,961 | A | * | 9/1985 | Atkins et al. | 137/271 |
| 4,617,952 | A | * | 10/1986 | Fujiwara et al. | 137/596.17 |
| 4,842,016 | A | | 6/1989 | McKenzie et al. | |
| 4,848,393 | A | * | 7/1989 | West | 137/312 |
| 4,913,189 | A | * | 4/1990 | Kline et al. | 137/884 |
| 4,982,734 | A | * | 1/1991 | Green et al. | 137/884 |
| 5,127,440 | A | * | 7/1992 | Maas et al. | 137/884 |
| 5,222,524 | A | * | 6/1993 | Sekler et al. | 137/884 |
| 5,443,093 | A | * | 8/1995 | Stoll et al. | 137/596.17 |
| 5,918,629 | A | * | 7/1999 | Hayashi et al. | 137/270 |
| 5,992,463 | A | * | 11/1999 | Redemann et al. | 137/884 |
| 6,286,548 | B1 | * | 9/2001 | Dettmann | 137/596.17 |
| 6,467,854 | B2 | * | 10/2002 | Frank et al. | 137/596.17 |
| 6,495,103 | B2 | * | 12/2002 | Hettinger | 137/269 |
| 6,688,325 | B2 | * | 2/2004 | Hettinger | 137/270 |
| 6,860,294 | B2 | * | 3/2005 | Hirota et al. | 137/625.43 |
| 7,247,778 | B2 | * | 7/2007 | Chase et al. | 137/597 |
| 7,261,121 | B2 | * | 8/2007 | Bordonaro et al. | 137/269 |

FOREIGN PATENT DOCUMENTS

| | | |
|---|---|---|
| CH | 5 12 701 | 9/1971 |
| DE | 69 10 080 U | 2/1973 |
| WO | WO 00/49317 | 8/2000 |

* cited by examiner

*Primary Examiner*—John Rivell
*Assistant Examiner*—Craig Price
(74) *Attorney, Agent, or Firm*—Stuart J. Friedman

(57) ABSTRACT

In a device for reversing the flow of flowing media including two multi-way valves (21) which are fluidically interconnected and mounted on an adapter plate (32), the two valves are identical and are fluidically connected with one another by being pushed one into the other via rotationally symmetrical sealing members that seal in the radial direction.

5 Claims, 5 Drawing Sheets

DEVICE AND VALVE COMBINATION FOR REVERSING THE FLOW OF FLOWING MEDIA

TECHNICAL FIELD

The present invention relates to a device for flow reversal of flowing media, and further relates to a valve combination.

BACKGROUND OF THE INVENTION

According to the prior art, pumps such as diaphragm pumps are capable of suction of a medium in the input and delivery of the medium in the output. A reversal of the direction of the medium delivered is not possible in diaphragm pumps which have passive inlet and outlet valves.

It is further known from the prior art that the direction of flow in a fluid line may be reversed by combining two 3-way valves, where the valves are, as a rule, arranged side by side on connecting plates. The electrical connection is mainly effected by means of single strands which are united in a cable harness and then led to a connector plug.

A disadvantage here is that systems of this type are susceptible to vibrations, which frequently results in the single strands becoming detached. This may lead to disturbing failures of the equipment.

As an alternative, for reversing the flow of diaphragm pumps valves systems are used in which a single coil actuates an elastomer-sheathed control member, two valve seats being opened and two other valve seats being closed at a time. In this variant, the fluid space is sealed by axially clamped seals.

It is disadvantageous here that leakages may appear in case of thermal stress or mechanical influences.

SUMMARY OF THE INVENTION

The present invention is intended to counter the above-mentioned disadvantages. This is achieved by a device for reversing the flow of flowing media, consisting of two multi-way valves which are fluidically interconnected and mounted on an adapter plate, in which the two valves are identical and are matingly interengaged with one another. This can be achieved by pushing one into the other via rotationally symmetrical sealing members that seal in a radial direction. This is further achieved by a valve combination for reversing a direction of flow of a medium by means of fluidically interconnected multi-way valves, in which provision is made for identical valve modules which are joined together so as to be complementary and include complementary coupling members which fluidically interconnect the joined valve modules.

Combining a pump, in particular a diaphragm pump, with a device or a valve combination according to the present invention allows the direction of delivery of a medium to be reversed while maintaining the direction of delivery of the pump unchanged, i.e. upon switch-over of a multi-way valve combination, the line hitherto used as the suction line is employed for delivery, and the line hitherto used as the pressure line is employed for suction.

In a further application, the present invention may be used to reverse the flow direction in a fluid line.

Two identical valves are linked fluidically and electrically in such a way that a very compact and sturdy assembly is produced and a cost-effecting manufacture is allowed owing to standardization. The seals are designed to be rotationally symmetrical and sealing in the radial direction, as a result of which reliable tightness is obtained even in the case of extreme thermal stresses.

The two identical multi-way valves integrated in the present invention are of such a design that they can be connected with each other in a simple manner and the connecting points are reliably sealed. Again using rotationally symmetrical and radially sealing seals, the connected valves are placed onto a mounting plate in which the medium is passed on to the inlet and outlet ports and, for example, to a feed pump. Preferably, the two valves are electrically connected in series; the coil connections lead directly to a connector, eliminating the need for pigtails.

The compact mechanical design and the elimination of single strands result in an extremely robust system that is highly insensitive to ambient vibrations.

DETAILED DESCRIPTION OF THE PREFERRED EMBODIMENTS

Figure 1:
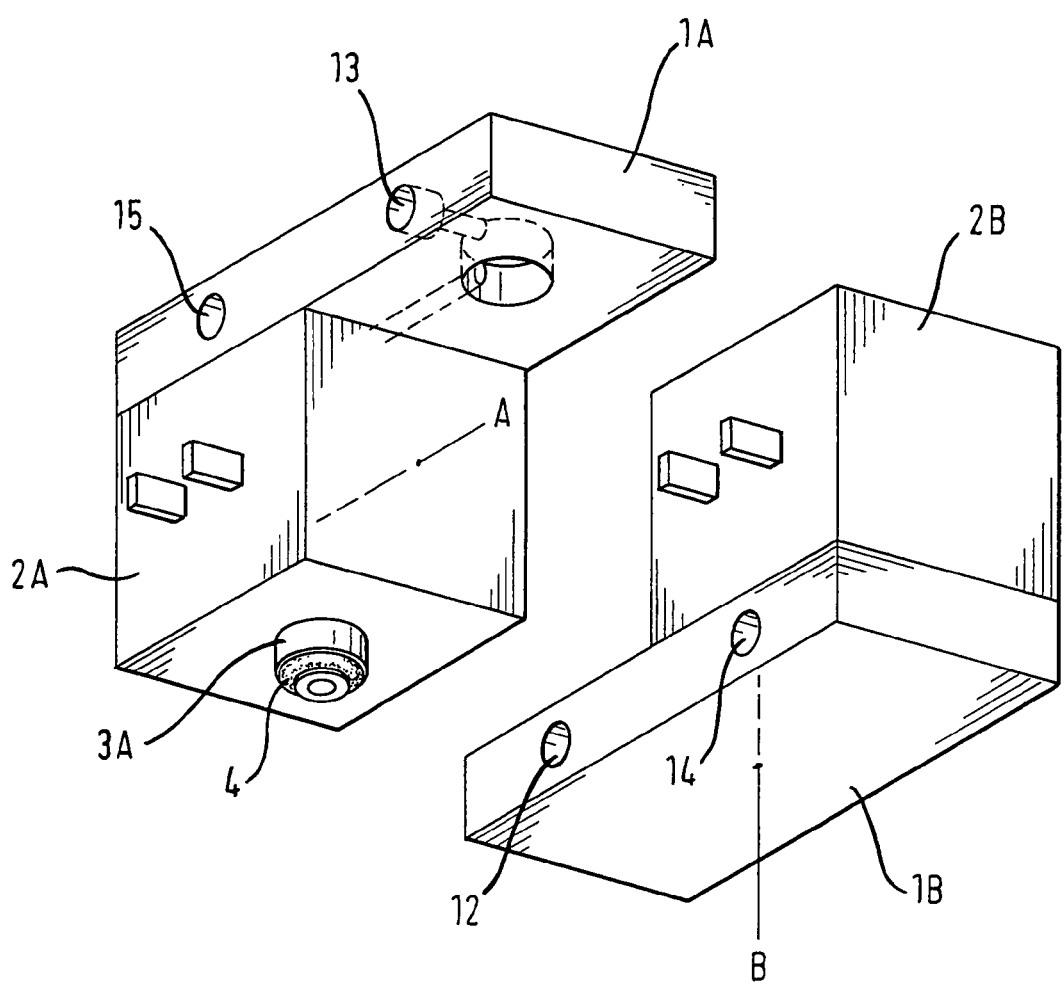
FIG. 1 shows an arrangement of two identical multi-way valves.
Figure 2:
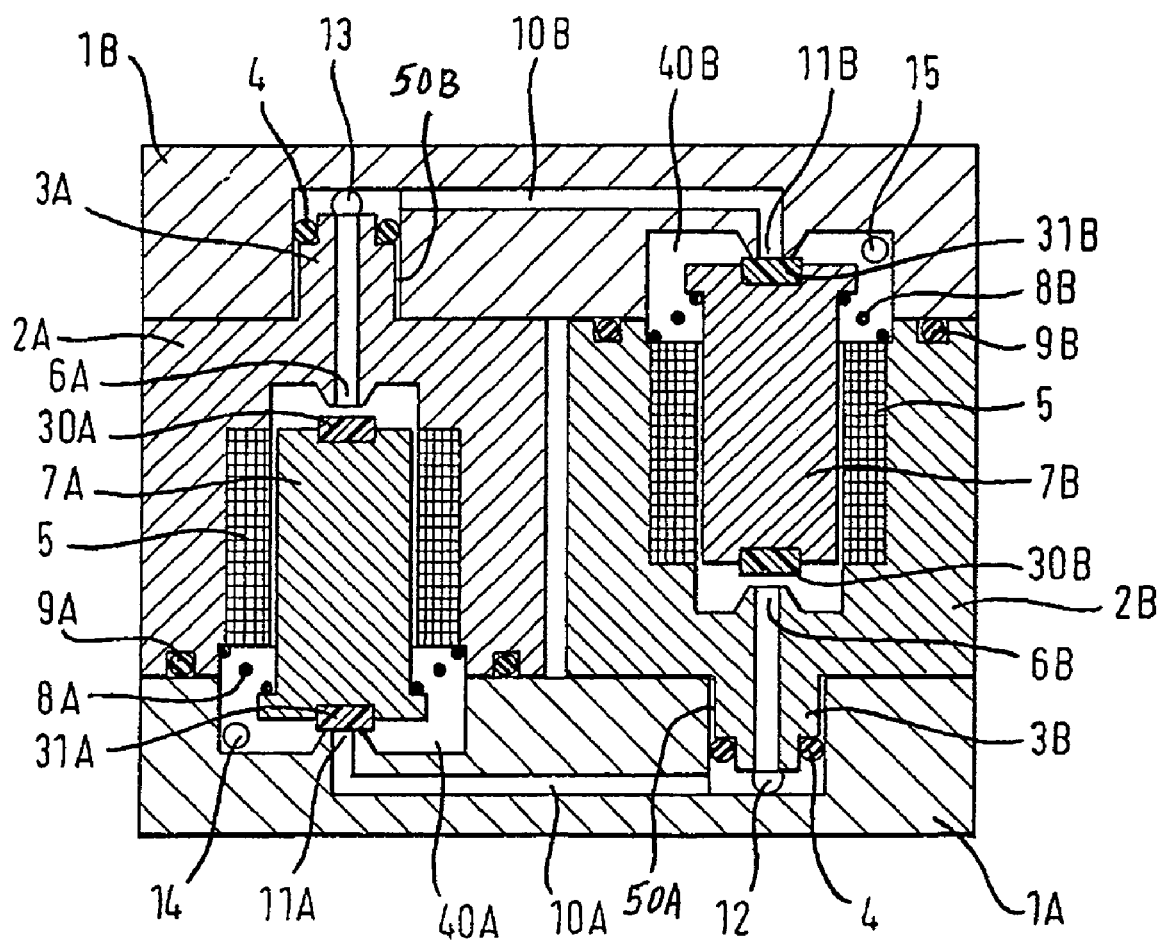
FIG. 2 shows a sectional view of the multi-way valves of FIG. 1.

FIG. 1 illustrates a multi-way combination made up of two identical valve elements, each containing a fluid housing 1A, 1B and a coil 2A, 2B. On its top side, the coil 2A, 2B has a cylindrical extension 3A, 3B for an O-ring 4 to be slipped on that seals the respective fluid housing 1A, 1B in the radial direction. The cylindrical extensions 3A, 3B are sealingly inserted in matching recesses 50B, 50A formed in adjacent fluid housings 1B, 1A, respectively. The two valve elements may be pushed one into the other, as is apparent from FIG. 2.

Figure 3:
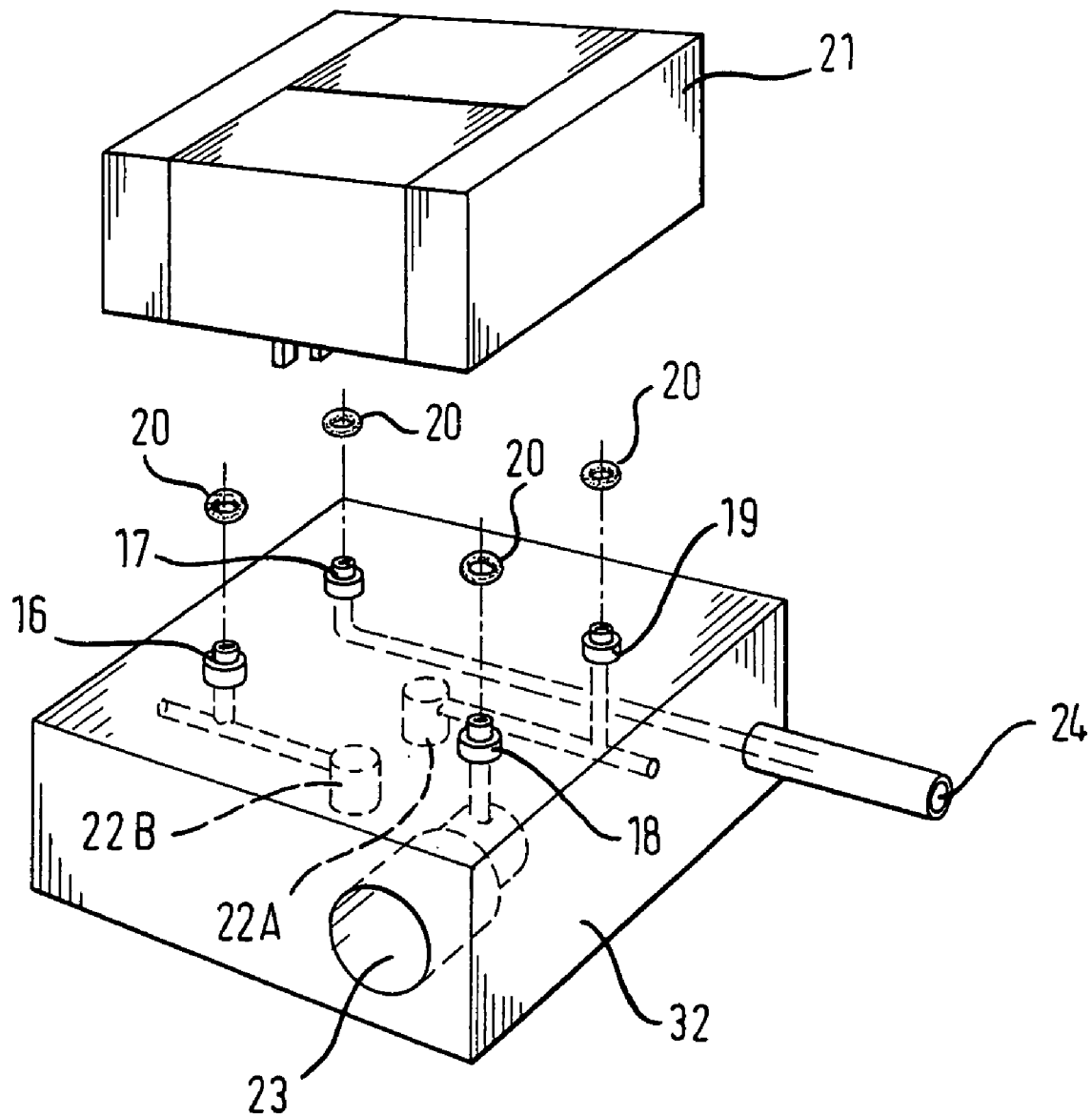
FIG. 3 shows a multi-way valve combination including an adapter plate, illustrating the fluidic linkage.

The multi-way valve combination 21 is illustrated in FIG. 3. It may simply be mounted on any desired adapter plate.

The coil 2A, 2B mainly consists of the winding 5, the upper valve seat 6A, 6B, the core 7A, 7B, the lower core spring 8A, 8B and the housing seal 9A, 9B.

Two ducts 10A, 10B connect the upper valve seats 6A, 6B and the housing seats 11A, 11B with each other, respectively. Connected with the respective ducts 10A, 10B are connecting ports 12, 13, which lead to associated connecting pieces 16, 19, respectively, in the adapter plate 32. In one exemplary embodiment, the two connecting pieces 16, 19 are connected with two ports 22A, 22B of the pump.

Connected to valve chambers 40A, 40B are respective further connecting ports 14, 15, which lead to connecting pieces 18, 17, respectively, in the adapter plate 32. O-rings 20 provide for a sealing in the radial direction.

The adapter plate 32 has fluid ports 23, 24 incorporated therein. Provision may be made here for the two pump ports 22A, 22B.

Figure 4:
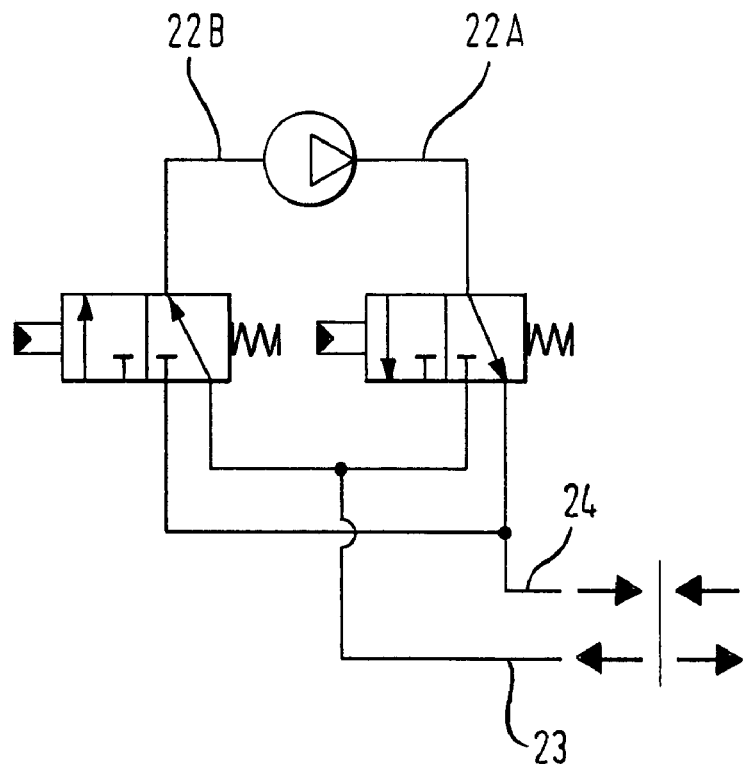
FIG. 4 shows a fluidic circuit diagram of the multi-way valve combination with a delivery device.

The circuitry of the valves is apparent from FIG. 4, when, as in one embodiment, a delivery device such as e.g. a pump is used. By switching over the two valves in the multi-way valve combination 21, the flow direction in the two connecting pipes 23, 24 will change.

Figure 5:
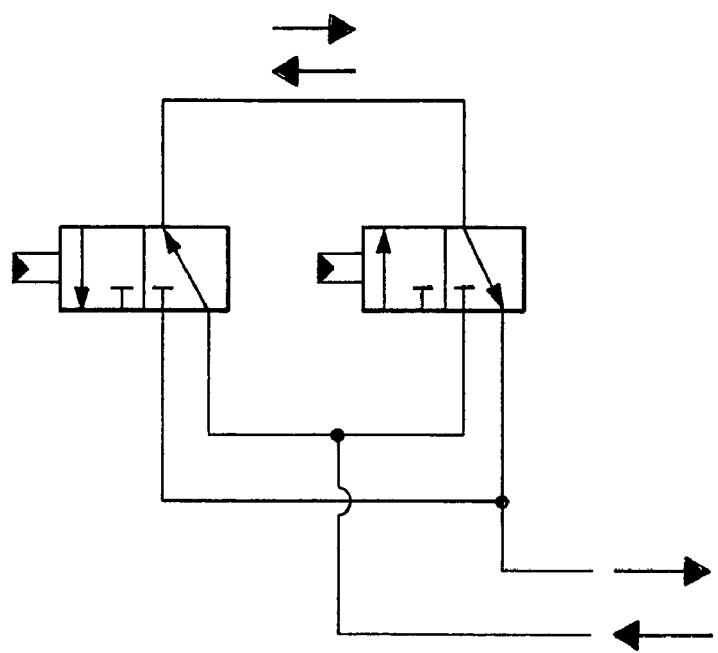
FIG. 5 shows a fluidic circuit diagram of the multi-way valve combination without a delivery device.

FIG. 5 illustrates a further embodiment without a delivery device.

Figure 6:
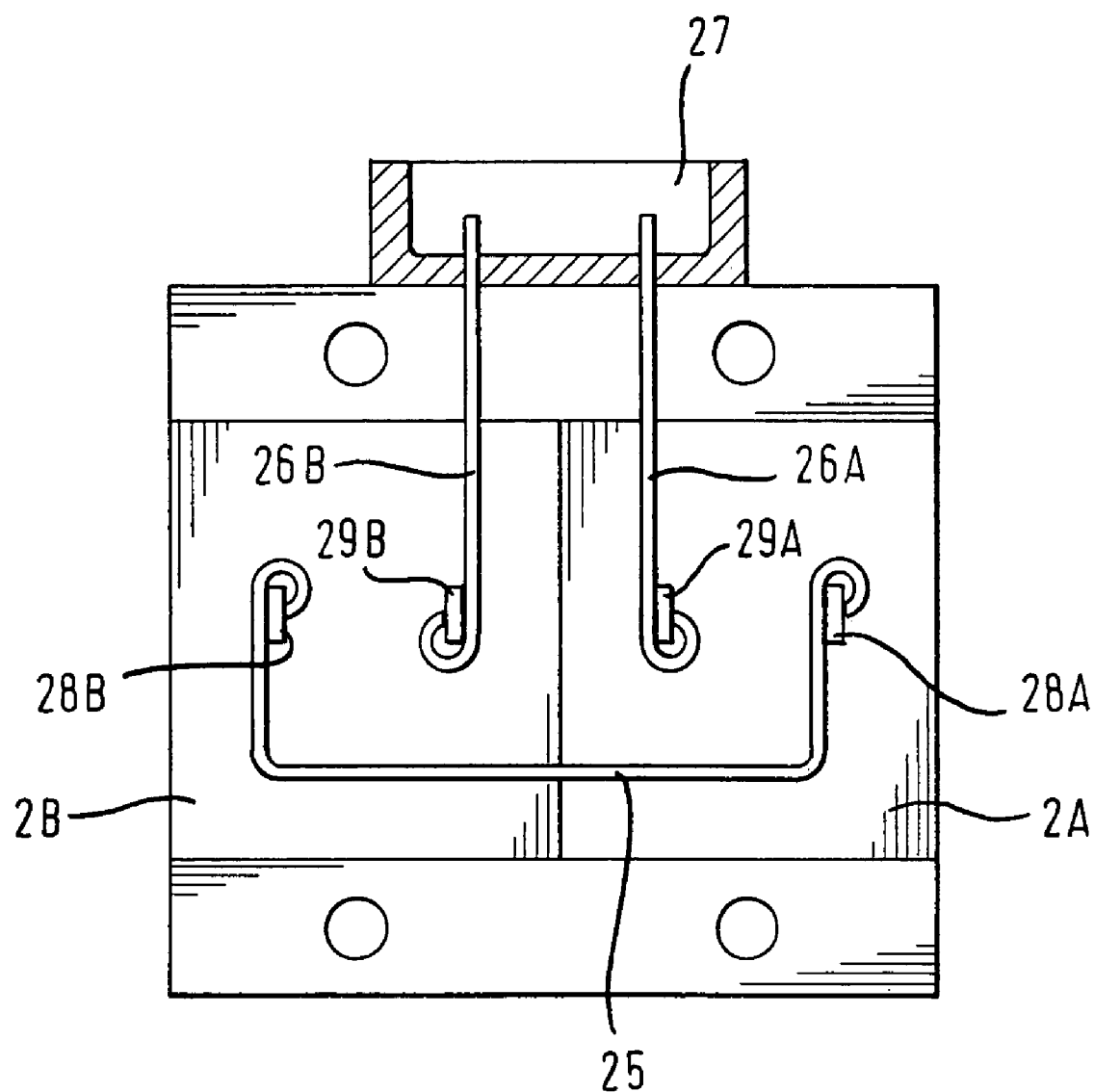
FIG. 6 shows an electrical connection of the two coils of the multi-way valve combination.

FIG. 6 shows the electrical connection of the two coils 2A, 2B. Two connector lugs 28A, 28B are electrically connected to a clamping member 25. Clamping members 26A, 26B are used to lead two further connector lugs 29A, 29B to a female connector 27. This provides for a series connection of the two coils.

The mode of functioning of the device according to the invention will now be described below.

In a first embodiment the medium is applied to the inlet 14 of the multi-way valve combination 21 in a de-energized condition and flows through the valve chamber 40A and via the open valve seat 6A to the port 13, which is connected to the suction-side input of a pump. The core 7A made of a magnetic material, which has sealing bodies or seals 31A, 30A firmly connected to it, closes the valve seat 11A by means of the spring 8A, and therefore no medium reaches the duct 10A. The duct 10B contains a medium which is applied to the seal 31B. The core 7B, which has seals 31B, 30B firmly connected to it, closes the valve seat 11B by means of the spring 8B, so that no medium reaches the valve chamber 40B.

The pressure-side output of the pump is connected to the port 12, from where the medium flows through the opened valve seat 6B and the valve chamber 40B into the outlet 15. Accordingly, in the de-energized condition, medium flows from the inlet 14 through the pump to the outlet 15 through the multi-way valve combination 21.

When the two valves in the multi-way valve combination are switched over, i.e. a current is applied to the coils 2A, 2B, the two cores 7A, 7B made of a magnetic material are attracted and close the valve seats 6A, 6B by means of the seals 30A, 30B, which are firmly connected to the ends of the cores 7A, 7B. The two valve seats 11A, 11B are opened. The medium will now flow from the outlet 15 through the multi-way valve combination 21 and to the inlet 14, with the delivery direction of the pump unchanged.

The seals may be vulcanized onto the cores, for example. As an alternative, the seals may be resiliently mounted inside the cores.

The invention claimed is:

1. A multi-way valve arrangement comprising two identical valve units, each valve unit consisting of a cuboid valve block, which accommodates a solenoid coil and a movable valve core, and a plate-shaped connecting block assembled together in an L-shape, both valve units being assembled in mutually opposite orientations with the valve blocks arranged side by side and between the connecting blocks, and the valve units being fluidically interconnected to permit a reversal of fluid flow by switching of said valve units.

2. The multi-way valve arrangement according to claim 1, further comprising a common adapter plate on which the valve units are mounted, the adapter plate having connecting members associated with fluid ports of the connecting blocks.

3. The multi-way valve arrangement according to claim 2, wherein said adapter plate has two pump ports for connection of a pump adapted to supply in a single direction of flow, and two external ports which alternatively constitute input and output ports according to the switching condition of said valve units.

4. The multi-way valve arrangement according to claim 1, wherein each valve unit has two valve sealing seats and the valve core in each valve unit has two opposed end faces and a sealing member on each end face opposite an associated one of said sealing seats, a first one of said sealing seats being formed in the valve block and a second one of said sealing seats being formed in the connecting block of a respectively other valve unit.

5. The multi-way valve arrangement according to claim 4, wherein the valve block has a cylindrical extension traversed by a duct that opens at the valve seat of the valve block, said cylindrical extension being sealingly inserted into a matching recess formed in the connecting block of a respectively other valve unit.

\* \* \* \* \*